United States Patent
Nishiyama et al.

(10) Patent No.: US 9,502,732 B2
(45) Date of Patent: Nov. 22, 2016

(54) FUEL CELL COMPRISING A KNOCK PIN

(71) Applicant: Honda Motor Co., Ltd., Tokyo (JP)

(72) Inventors: Tadashi Nishiyama, Sakura (JP); Yusuke Nara, Utsunomiya (JP)

(73) Assignee: Honda Motor Co., Ltd., Tokyo (JP)

( * ) Notice: Subject to any disclaimer, the term of this patent is extended or adjusted under 35 U.S.C. 154(b) by 217 days.

(21) Appl. No.: 14/097,777

(22) Filed: Dec. 5, 2013

(65) Prior Publication Data

US 2014/0162166 A1    Jun. 12, 2014

(30) Foreign Application Priority Data

Dec. 7, 2012  (JP) ................................ 2012-268424
Nov. 5, 2013  (JP) ................................ 2013-229345

(51) Int. Cl.
H01M 8/02    (2016.01)
H01M 8/24    (2016.01)
H01M 8/10    (2016.01)

(52) U.S. Cl.
CPC ..... *H01M 8/247* (2013.01); *H01M 2008/1095* (2013.01); *Y02E 60/50* (2013.01)

(58) Field of Classification Search
CPC .. H01M 8/2485; H01M 8/24; H01M 8/0247; H01M 8/0273; H01M 8/0271; H01M 8/0202; H01M 8/0221
See application file for complete search history.

(56) References Cited

U.S. PATENT DOCUMENTS

| | | | |
|---|---|---|---|
| 6,948,548 B2 * | 9/2005 | Yanagimoto | B22D 7/06 164/338.1 |
| 2002/0068208 A1 * | 6/2002 | Dristy | C25B 9/08 429/510 |
| 2004/0202916 A1 * | 10/2004 | Goto | H01M 8/0247 429/468 |
| 2007/0202385 A1 | 8/2007 | Minamiura et al. | |
| 2008/0003468 A1 * | 1/2008 | Finkelshtain | H01M 8/04186 429/421 |
| 2008/0166600 A1 * | 7/2008 | Tanaka | H01M 8/247 429/470 |
| 2008/0226964 A1 * | 9/2008 | Nishiyama | H01M 8/04126 429/443 |
| 2009/0068540 A1 | 3/2009 | Hayashi et al. | |
| 2010/0092836 A1 | 4/2010 | Saito et al. | |
| 2011/0200908 A1 * | 8/2011 | Blondin | H01M 8/02 429/455 |

FOREIGN PATENT DOCUMENTS

| | | |
|---|---|---|
| CN | 101030648 A | 9/2007 |
| JP | 9-55221 | 2/1997 |
| JP | 9-134734 | 5/1997 |
| JP | 2000-12067 | 1/2000 |

(Continued)

OTHER PUBLICATIONS

Machine Translation of: JP 09-134734 A, Yanagihara, May 20, 1997.*

(Continued)

*Primary Examiner* — Kenneth Douyette
(74) *Attorney, Agent, or Firm* — Nelson Mullins Riley & Scarborough LLP; Anthony A. Laurentano

(57) ABSTRACT

In a fuel cell stack, knock pins extending in a stacking direction are provided between a first end plate and a second end plate for positioning a stack body. The first end plate and the second end plate have insertion holes for insertion of knock pins. A diameter-increasing surface is formed in an inner circumferential surface of each insertion hole in a direction spaced from the knock pin to increase the diameter of the insertion hole.

4 Claims, 10 Drawing Sheets

(56) References Cited

FOREIGN PATENT DOCUMENTS

| | | | | |
|---|---|---|---|---|
| JP | 2000-012067 A1 * | 1/2000 | ............. | H01M 8/02 |
| JP | 3427915 | 5/2003 | | |
| JP | 2006-221897 | 8/2006 | | |
| JP | 2008-11681 | 1/2008 | | |
| JP | 2008-59760 | 3/2008 | | |
| JP | 2008-293736 A | 12/2008 | | |
| JP | 4539069 | 7/2010 | | |
| JP | 4889880 | 12/2011 | | |
| JP | 5040127 | 7/2012 | | |
| JP | 5125022 | 11/2012 | | |
| JP | 5151116 | 12/2012 | | |
| JP | 2013-98154 | 5/2013 | | |
| JP | 2013-161549 | 8/2013 | | |
| JP | 2013-196849 | 9/2013 | | |
| JP | 2013-219028 | 10/2013 | | |
| WO | 2006/085463 A1 | 8/2006 | | |

OTHER PUBLICATIONS

Chinese Office Action and Search Report, Chinese Application No. 201310643145.9, dated Aug. 21, 2015, pp. 1-10.

* cited by examiner

FUEL CELL COMPRISING A KNOCK PIN

CROSS-REFERENCE TO RELATED APPLICATIONS

This application is based upon and claims the benefit of priority from Japanese Patent Applications No. 2012-268424 filed on Dec. 7, 2012 and No. 2013-229345 filed on Nov. 5, 2013, the contents all of which are incorporated herein by reference.

BACKGROUND OF THE INVENTION

1. Field of the Invention

The present invention relates to a fuel cell stack including a stack body formed by stacking a plurality of power generation cells in a stacking direction. Each of the power generation cells is formed by stacking a membrane electrode assembly and a separator. The membrane electrode assembly includes a pair of electrodes and an electrolyte membrane interposed between the electrodes. End plates are provided at both ends of the stack body in the stacking direction.

2. Description of the Related Art

For example, a solid polymer electrolyte fuel cell employs a polymer ion exchange membrane as an electrolyte membrane, and the polymer electrolyte membrane is interposed between an anode and a cathode to form a membrane electrode assembly (MEA). The membrane electrode assembly and a pair of separators sandwiching the membrane electrode assembly make up a power generation cell for generating electricity. In use, typically, a predetermined number of the power generation cells are stacked together to form a fuel cell stack, e.g., mounted in a vehicle.

In the fuel cell stack, internal manifolds are often adopted for supplying a fuel gas and an oxygen-containing gas as reactant gases to the anode and the cathode of each of the stacked power generation cells. The internal manifold includes reactant gas supply passages and reactant gas discharge passages extending through the power generation cells in the stacking direction.

In the case where the fuel cell stack is, in particular, mounted in a vehicle, a considerably large number of power generation cells need to be stacked together. Therefore, the power generation cells need to be positioned accurately. For example, a method of assembling a fuel cell disclosed in Japanese Laid-Open Patent Publication No. 09-134734 is known.

In the assembling method, as shown in FIG. 10, positioning holes 3 for assembling cells 5 are formed in a pressure application plate 2 for applying pressure to a stack 1. Elongated knock pins 4 having chamfered end surfaces, made of PTFE are inserted upright into the positioning holes 3. Then, the cells 5 having the positioning holes 3 are stacked together successively such that the positioning holes 3 of the cells 5 are fitted to the knock pins 4 to form the stack 1. Thereafter, components of the stack 1 are fixed tightly.

SUMMARY OF THE INVENTION

In the case where the fuel cell stack is mounted in a vehicle, in most cases, external loads are applied to the fuel cell stack. For example, an external load in a direction intersecting with the stacking direction of the cells 5, indicated by an arrow H in FIG. 10 tends to be applied to the fuel cell stack. In this regard, in the state where the knock pins 4 are fitted to the positioning holes 3 of the pressure application plate 2, the knock pins 4 suppress positional displacement among the stacked cells 5. In the structure, excessive bending stress is locally applied to the knock pins 4 around the positioning holes 3 of the pressure application plate 2 acting as a fulcrum point. Consequently, damages or the like may occur in the knock pins 4 undesirably.

The present invention has been made to solve such problems, and an object of the present invention is to provide a fuel cell stack having simple structure in which it is possible to suppress application of excessive stress to a knock pin.

A fuel cell stack according to the present invention includes a stack body formed by stacking a plurality of power generation cells in a stacking direction. Each of the power generation cells is formed by stacking a membrane electrode assembly and a separator. The membrane electrode assembly includes a pair of electrodes and an electrolyte membrane interposed between the electrodes. End plates are provided at both ends of the stack body in the stacking direction.

In this fuel cell stack, a knock pin extending in the stacking direction is provided between the end plates for positioning the stack body. The end plate has an insertion hole for insertion of the knock pin, and a diameter-increasing surface is formed in an inner circumferential surface of the insertion hole in a radial direction spaced from the knock pin to increase the diameter of the insertion hole.

In the present invention, the knock pin is inserted into the insertion hole of the end plate. Further, the diameter-increasing surface is formed in the inner circumferential surface of the insertion hole in the radial direction spaced from the knock pin to increase the diameter of the insertion hole. In the structure, when an external load is applied to the fuel cell stack in a direction intersecting with the stacking direction of the power generation cells, the knock pin can suppress positional displacement among the power generation cells, and the knock pin can be tilt along the diameter-increasing surface within of the insertion hole. Thus, with the simple structure, it is possible to suppress the excessive stress from being applied locally to a certain portion of the knock pin in a concentrated manner, and it becomes possible to suppress damages or the like of the knock pin as much as possible.

The above and other objects, features and advantages of the present invention will become more apparent from the following description when taken in conjunction with the accompanying drawings in which preferred embodiments of the present invention are shown by way of illustrative example.

DESCRIPTION OF THE PREFERRED EMBODIMENTS

Figure 1:
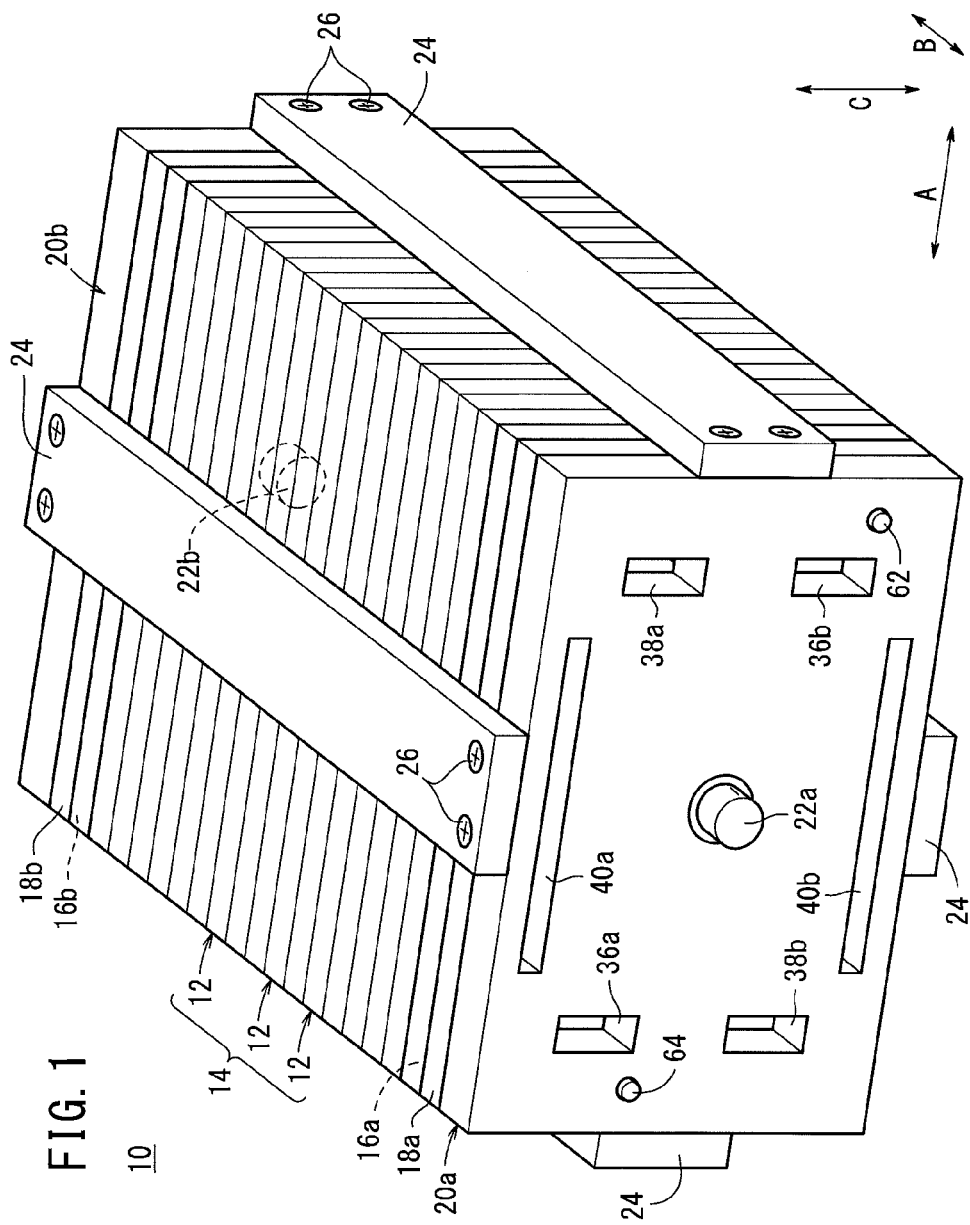
FIG. 1 is a perspective view schematically showing a fuel cell stack according to a first embodiment of the present invention.

As shown in FIG. 1, a fuel cell 10 according to a first embodiment of the present invention includes a stack body 14 formed by stacking a plurality of power generation cells (fuel cells) 12 in an upright position together in a horizontal direction indicated by an arrow B.

Figure 2:
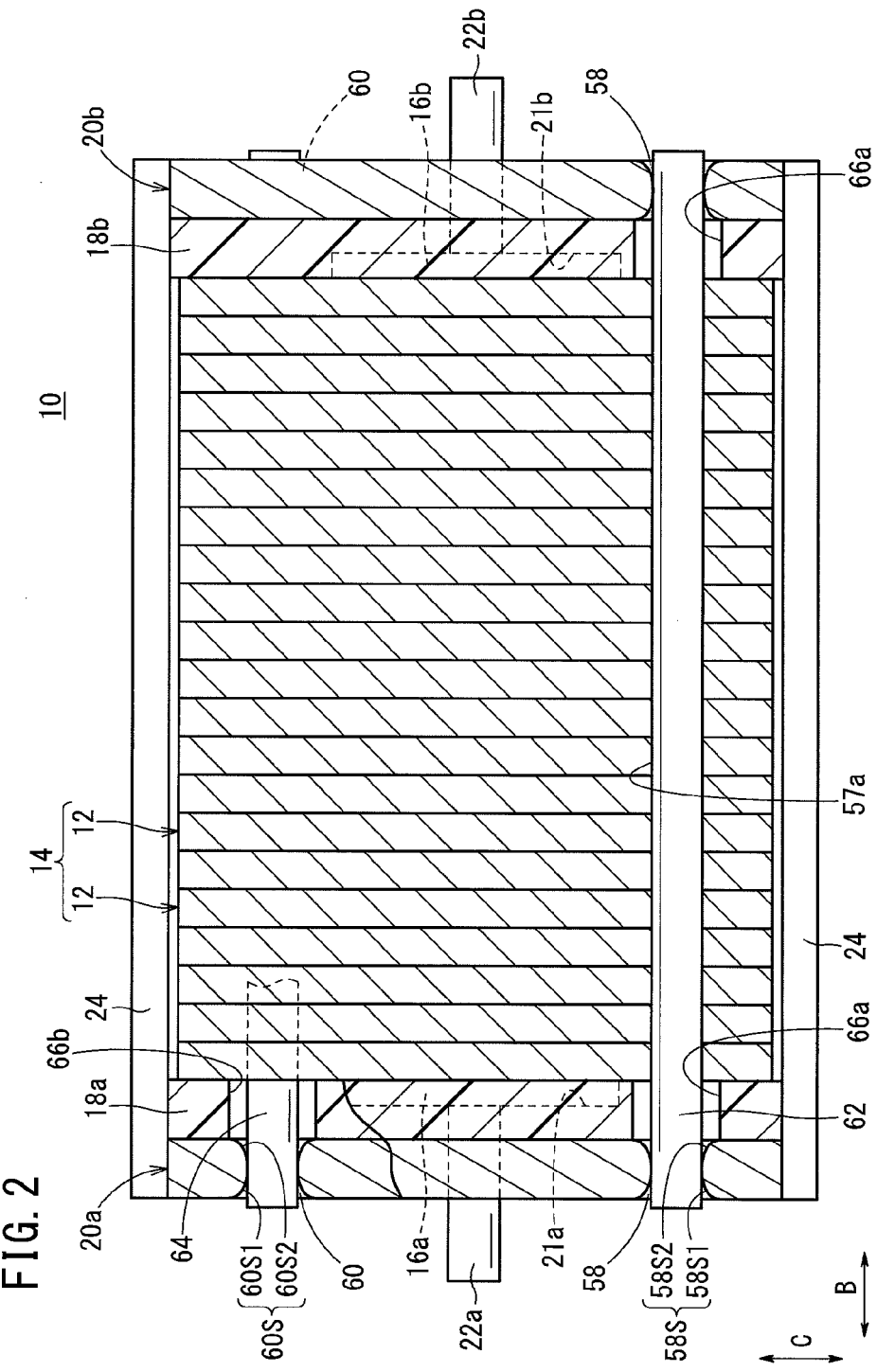
FIG. 2 is a cross sectional side view showing the fuel cell stack.

As shown in FIGS. 1 and 2, at one end of the stack body 14 in a stacking direction, a terminal plate 16a is provided. An insulating plate 18a is provided outside the terminal plate 16a. Further, a first end plate 20a is provided outside the insulating plate 18a. At the other end of the stack body 14 in the stacking direction, a terminal plate 16b is provided. An insulating plate 18b is provided outside the terminal plate 16b. Further, a second end plate 20b is provided outside the insulating plate 18b. The surface sizes of the terminal plates 16a, 16b are smaller than the surface sizes of the insulating plates 18a, 18b, and the terminal plates 16a, 16b are placed inside openings 21a, 21b formed at central portions of the insulating plates 18a, 18b (see FIG. 2).

An output terminal 22a connected to the terminal plate 16a extends from a substantially central portion (or a position adjacent to one side) of the first end plate 20a, and an output terminal 22b connected to the terminal plate 16b extends from a central portion of the second end plate 20b. Electrical energy generated in the fuel cell stack 10 is collected to the outside from the output terminals 22a, 22b.

As shown in FIG. 1, the first end plate 20a and the second end plate 20b have a laterally (or longitudinally) elongated rectangular shape. Coupling bars 24 are provided at intermediate positions of respective sides of the first end plate 20a and the second end plate 20b. Both ends of each coupling bar 24 are fixed to the first end plate 20a and the second end plate 20b using bolts 26 for applying a tightening load to the plurality of stacked power generation cells 12 in the stacking direction indicated by the arrow B.

Figure 3:
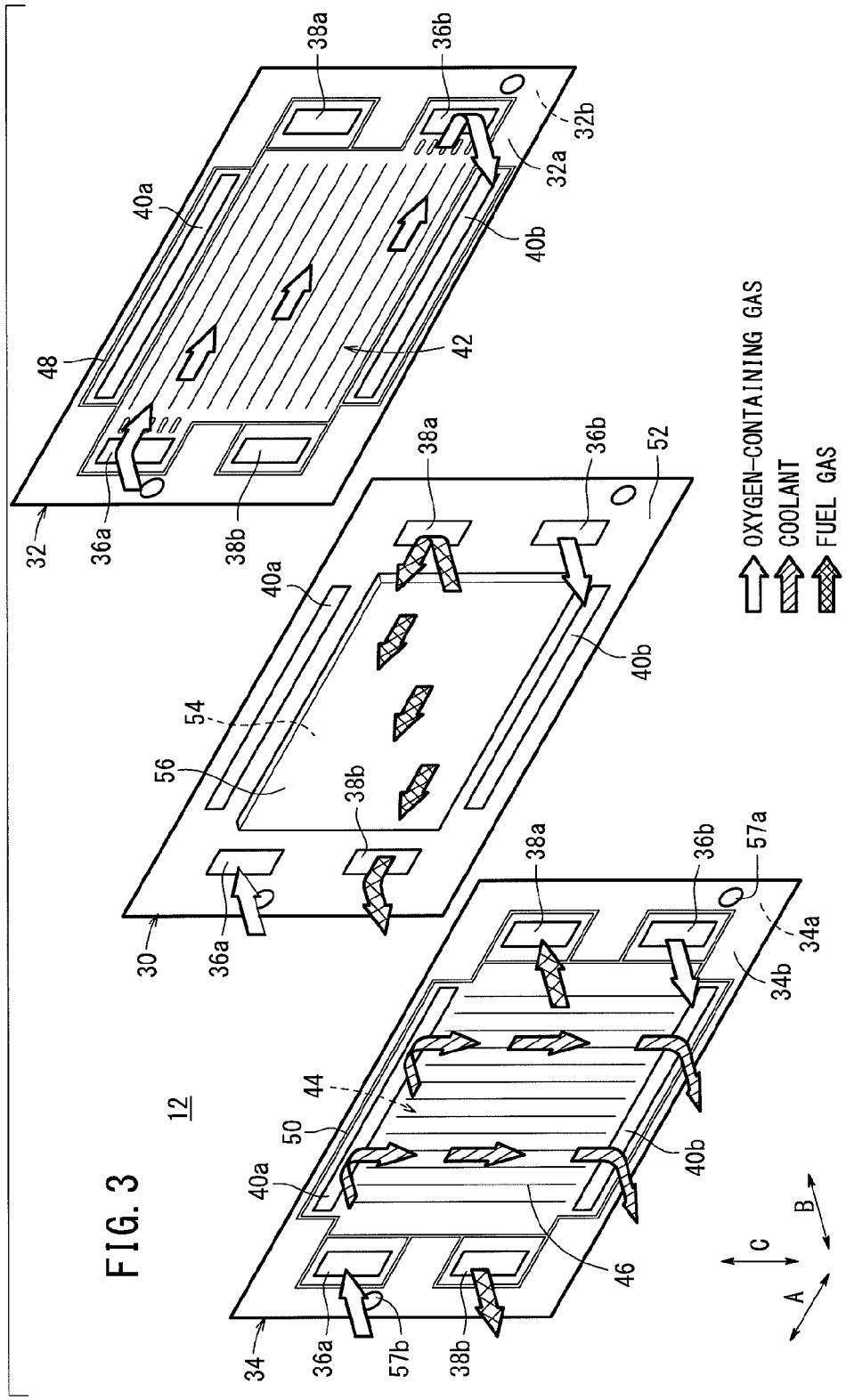
FIG. 3 is an exploded perspective view showing main components of a power generation cell of the fuel cell stack.

As shown in FIG. 3, the power generation cell 12 has a laterally (or longitudinally) elongated rectangular shape. The power generation cell 12 includes a membrane electrode assembly 30 and a first separator 32 and a second separator 34 sandwiching the membrane electrode assembly 30. For example, the first separator 32 and the second separator 34 are metal separators made of metal plates such as steel plates, stainless steel plates, aluminum plates, or plated steel sheets. Alternatively, carbon separators may be used as the first separator 32 and the second separator 34.

At one end of the power generation cell 12 in a horizontal direction indicated by an arrow A in FIG. 3, an oxygen-containing gas supply passage 36a for supplying an oxygen-containing gas, and a fuel gas discharge passage 38b for discharging a fuel gas such as a hydrogen-containing gas are arranged in a vertical direction indicated by an arrow C. The oxygen-containing gas supply passage 36a and the fuel gas discharge passage 38b extend through the power generation cell 12 in the stacking direction indicated by the arrow B.

At the other end of the power generation cell 12 in the direction indicated by the arrow A, a fuel gas supply passage 38a for supplying the fuel gas and an oxygen-containing gas discharge passage 36b for discharging the oxygen-containing gas are arranged in the direction indicated by the arrow C. The fuel gas supply passage 38a and the oxygen-containing gas discharge passage 36b extend through the power generation cell 12 in the direction indicated by the arrow B.

At an upper end of the power generation cell 12 in the direction indicated by the arrow C, a coolant supply passage 40a for supplying the coolant is provided, and at a lower end of the power generation cell 12 in the direction indicated by the arrow C, a coolant discharge passage 40b for discharging the coolant is provided.

The first separator 32 has an oxygen-containing gas flow field 42 facing the membrane electrode assembly 30. The oxygen-containing gas flow field 42 is connected to the oxygen-containing gas supply passage 36a and the oxygen-containing gas discharge passage 36b. The oxygen-containing gas flow field 42 includes a plurality of flow grooves extending in the horizontal direction indicated by the arrow A.

The second separator 34 has a fuel gas flow field 44 facing the membrane electrode assembly 30. The fuel gas flow field 44 is connected to the fuel gas supply passage 38a and the fuel gas discharge passage 38b. The fuel gas flow field 44 includes a plurality of flow grooves extending in the horizontal direction indicated by the arrow A.

A coolant flow field 46 is formed between a surface 32b of the first separator 32 of one of adjacent power generation cells 12 and a surface 34b of the second separator 34 of the other of the adjacent power generation cells 12. The coolant flow field 46 is connected to the coolant supply passage 40a and the coolant discharge passage 40b.

Seal member 48, 50 are formed integrally with the first separator 32 and the second separator 34, respectively. Alternatively, the seal members separate from the first separator 32 and the second separator 34 may be provided as the seal members 48, 50 on the first separator 32 and the second separator 34, respectively. Each of the seal members 48, 50 is made of seal material, cushion material, or packing material such as an EPDM rubber (ethylene propylene diene methylene rubber), an NBR (nitrile butadiene rubber), a fluoro rubber, a silicone rubber, a fluorosilicone rubber, a Butyl rubber, a natural rubber, a styrene rubber, a chloroprene rubber, or an acrylic rubber.

The membrane electrode assembly 30 includes a cathode 54 and an anode 56, and a solid polymer electrolyte membrane 52 interposed between the cathode 54 and the anode 56. The solid polymer electrolyte membrane 52 is formed by impregnating a thin membrane of perfluorosulfonic acid with water, for example.

Each of the cathode 54 and the anode 56 has a gas diffusion layer such as a carbon paper, and an electrode catalyst layer of platinum alloy supported on porous carbon particles. The carbon particles are deposited uniformly on the surface of the gas diffusion layer. The electrode catalyst layer of the cathode 54 and the electrode catalyst layer of the anode 56 are fixed to both surfaces of the solid polymer electrolyte membrane 52, respectively.

Positioning holes 57a, 57b are formed along one of diagonal lines of the power generation cell 12, specifically, adjacent to the oxygen-containing gas discharge passage 36b and adjacent to the oxygen-containing gas supply passage 36a, respectively. Alternatively, the positioning holes 57a, 57b may be formed in insulating resin frame members provided integrally with the first separator 32 and the second separator 34. The membrane electrode assembly 30 may adopt structure where the positioning holes 57a, 57b are not formed in the solid polymer electrolyte membrane 52 to reduce the size of the outer end portion of the solid polymer electrolyte membrane 52.

The positions of the positioning holes 57a, 57b are not limited specially as long as the positioning holes 57a, 57b are provided in the surfaces of the first separator 32 and the second separator 34. Preferably, the positioning holes 57a, 57b are formed outside the seal members 48, 50, and two or more positioning holes 57a and two or more positioning holes 57b may be formed. Further, the positioning holes 57a, 57b may be formed along the other of diagonal lines of the power generation cell 12. Insertion holes 58, 60 are formed in the first end plate 20a and the second end plate 20b, coaxially with the positioning holes 57a, 57b.

As shown in FIG. 2, diameter-increasing surfaces are formed in the inner circumferential surface 58S of the insertion hole 58 in a radial direction spaced from a knock pin 62 described later to increase the diameter of the insertion hole 58. Specifically, at both ends of the inner circumferential surface 58S in the axial direction indicated by the arrow B, surfaces 58S1, 58S2 curved in cross-section are formed as the diameter-increasing surfaces. Since the curved surfaces 58S1, 58S2 are contiguous to each other, in effect, the inner circumferential surface 58S includes a single curved surface (round surface).

Diameter-increasing surfaces are formed in the inner circumferential surface 60S of the insertion hole 60 in a radial direction spaced from a knock pin 64 described later to increase the diameter of the insertion hole 60. Specifically, at both ends of the inner circumferential surface 60S in the axial direction, surfaces 60S1, 60S2 curved in cross-section are formed as the diameter-increasing surfaces. Since the curved surfaces 60S1, 60S2 are contiguous to each other, in effect, the inner circumferential surface 60S includes a single curved surface (round surface).

Figure 4:
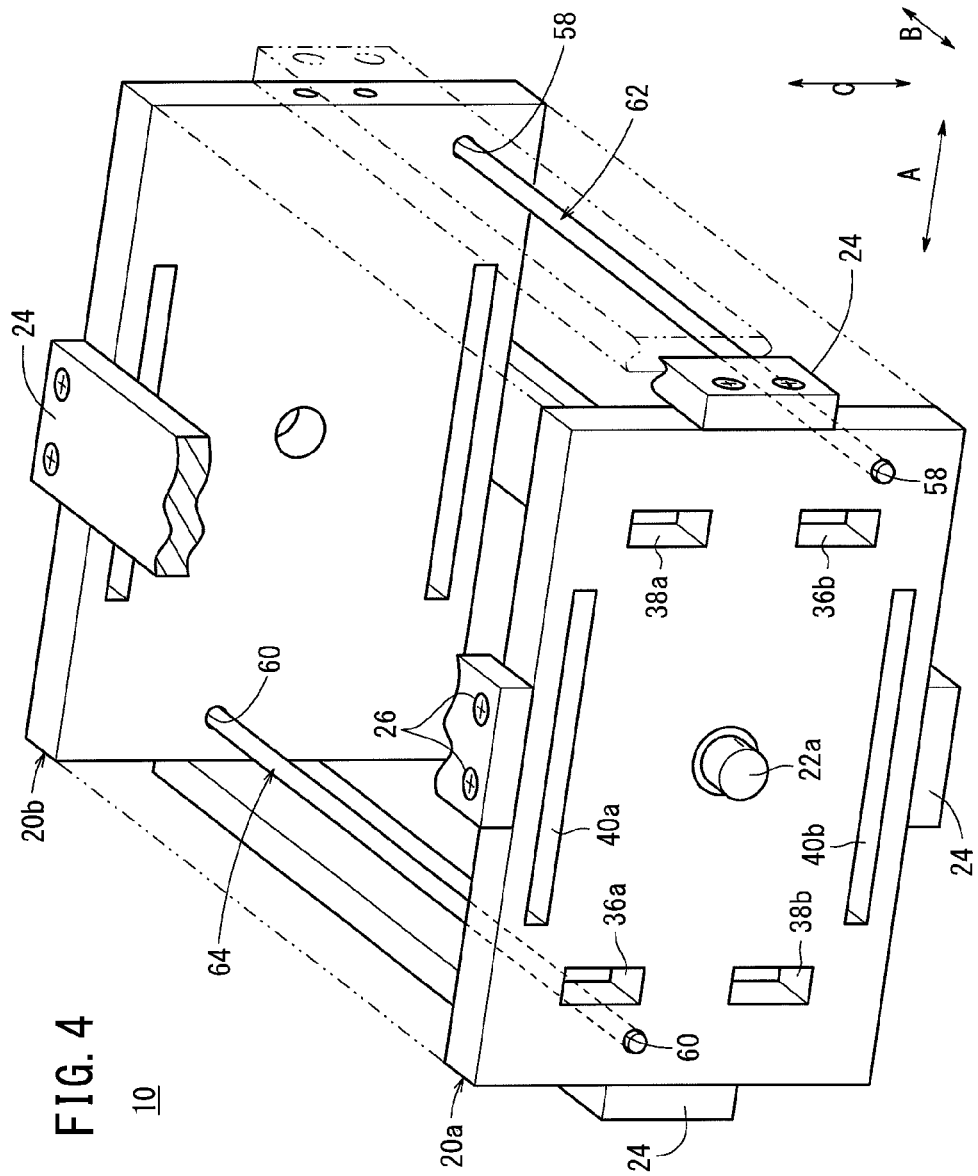
FIG. 4 is a perspective view showing knock pins of the fuel cell stack.

As shown in FIG. 4, columnar knock pins (rod members) 62, 64 are provided at the first end plate 20a and the second end plate 20b. The knock pins 62, 64 extend in the stacking direction, and the knock pins 62, 64 are inserted integrally into both of the insertion holes 58, 60 and the positioning holes 57a, 57b coaxially with the insertion holes 58, 60. At least two (two or more) knock pins 62, 64 are provided, and fitted to the positioning holes 57a, 57b. Preferably, the knock pins 62, 64 are fitted to portions where the diameter of the opening is the smallest in the inner circumferential surfaces 58S, 60S of the insertion holes 58, 60 (see FIG. 2). Preferably, each of the knock pins 62, 64 is formed of electrically conductive metal of SUS (stainless steel), aluminum, or iron, insulating resin such as PPS (poly phenylene sulfide resin), or carbon, etc.

The insulating plates 18a, 18b have holes 66a, 66b, and the diameter of the holes 66a, 66b is larger than the diameter of the positioning holes 57a, 57b and the diameter of the insertion holes 58, 60. Lid members (not shown) are provided at the first end plate 20a and the second end plate 20b for preventing detachment of the knock pins 62, 64. Instead of the lid members, for example, snap rings, split pins, or the like may be used.

As shown in FIG. 1, the oxygen-containing gas supply passage 36a, the oxygen-containing gas discharge passage 36b, the fuel gas supply passage 38a, the fuel gas discharge passage 38b, the coolant supply passage 40a, and the coolant discharge passage 40b are formed in the first end plate 20a.

Though not shown, manifold members are connected to these fluid passages. Some of manifold members connected to the fluid passages may be provided at one of the first end plate 20a and the second end plate 20b, and the other manifold members connected to the fluid passages may be provided at the other of the first end plate 20a and the second end plate 20b.

Operation of the fuel cell stack 10 will be described below.

Firstly, as shown in FIG. 3, an oxygen-containing gas is supplied to the oxygen-containing gas supply passage 36a, and a fuel gas such as a hydrogen-containing gas is supplied to the fuel gas supply passage 38a. Further, a coolant such as pure water, ethylene glycol, or oil is supplied to the coolant supply passage 40a.

Thus, the oxygen-containing gas flows from the oxygen-containing gas supply passage 36a into the oxygen-containing gas flow field 42 of the first separator 32. The oxygen-containing gas moves along the oxygen-containing gas flow field 42 in the horizontal direction, and the oxygen-containing gas is supplied to the cathode 54 of the membrane electrode assembly 30 for inducing an electrochemical reaction at the cathode 54.

In the meanwhile, the fuel gas flows from the fuel gas supply passage 38a into the fuel gas flow field 44 of the second separator 34. The fuel gas moves along the fuel gas flow field 44 in the horizontal direction, and the fuel gas is supplied to the anode 56 of the membrane electrode assembly 30 for inducing an electrochemical reaction at the anode 56.

Thus, in the membrane electrode assembly 30, the oxygen-containing gas supplied to the cathode 54, and the fuel gas supplied to the anode 56 are consumed in the electrochemical reactions at catalyst layers of the cathode 54 and the anode 56 for generating electricity.

Then, the oxygen-containing gas after being subjected to the cathode 54 is discharged along the oxygen-containing gas discharge passage 36b in the direction indicated by the arrow B. Likewise, the fuel gas after being subjected to the anode 56 is discharged along the fuel gas discharge passage 38b in the direction indicated by the arrow B.

Further, the coolant supplied to the coolant supply passage 40a flows into the coolant flow field 46 between the first separator 32 and the second separator 34, and then, is oriented in the direction indicated by the arrow C. After the coolant cools the membrane electrode assembly 30, the coolant is discharged into the coolant discharge passage 40b.

In the first embodiment, as shown in FIG. 2, the insertion holes 58, 60 are formed in the first end plate 20a and the second end plate 20b for insertion of the knock pins 62, 64. At both ends of the inner circumferential surface 58S of the insertion hole 58, the curved surfaces 58S1, 58S2 are formed as the diameter-increasing surfaces, respectively, to increase the diameter of the insertion hole 58. At both ends of the inner circumferential surface 60S of the insertion hole 60, the curved surfaces 60S1, 60S2 are formed as the diameter-increasing surfaces, respectively, to increase the diameter of the insertion hole 60.

Figure 5:
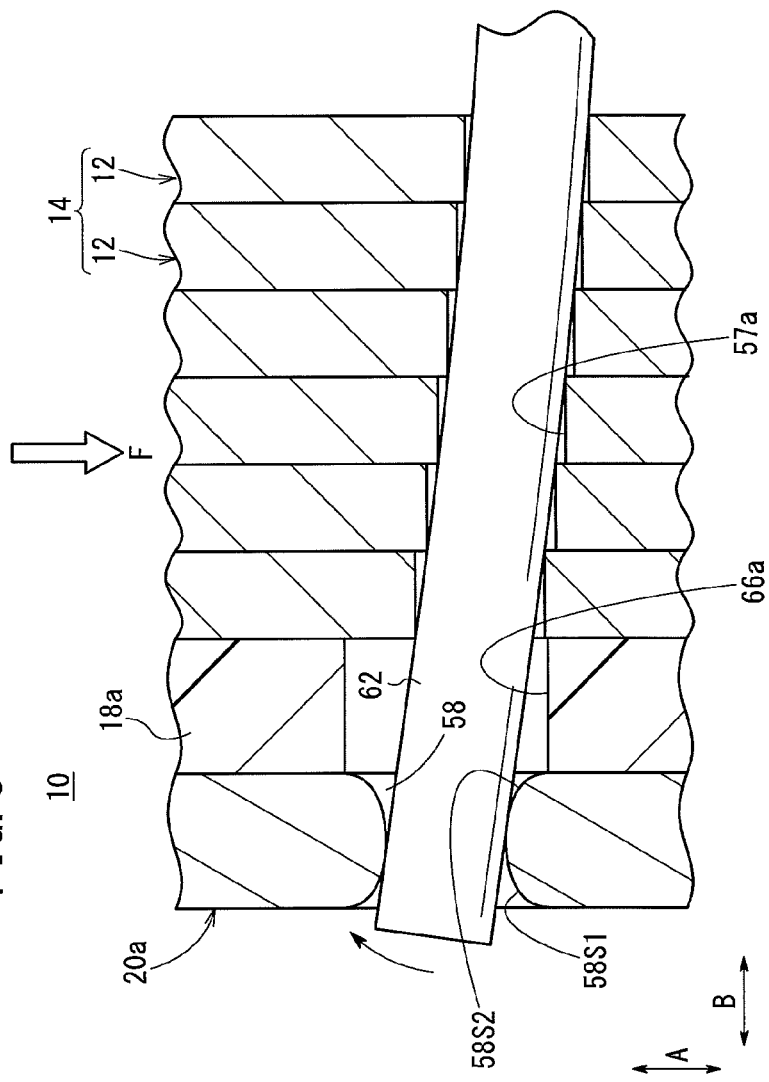
FIG. 5 is a view showing operation when an external load is applied to the fuel cell stack.

In the structure, for example, as shown in FIG. 5, when an external load F is applied to a side of the fuel cell stack 10 in the direction indicated by the arrow A, the stacked power generation cells 12 press the knock pin 62 in the direction indicated by the arrow A. Therefore, bending stress is applied to the knock pin 62.

At this time, the end of the knock pin 62 can be tilt within the insertion hole 58. Specifically, the knock pin 62 can be tilt in correspondence with the shapes of the curved surfaces

58S1, 58S2 of the inner circumferential surface 58S that increase the diameter of the insertion hole 58 in cross-section. Thus, with the simple structure, it is possible to suppress the excessive stress from being applied locally to a certain portion of the knock pin 62 in a concentrated manner, and it becomes possible to suppress damages or the like of the knock pin 62 as much as possible. Further, on the part of the knock pin 64, the same advantages as in the case of the above knock pin 62 are obtained.

Figure 6:
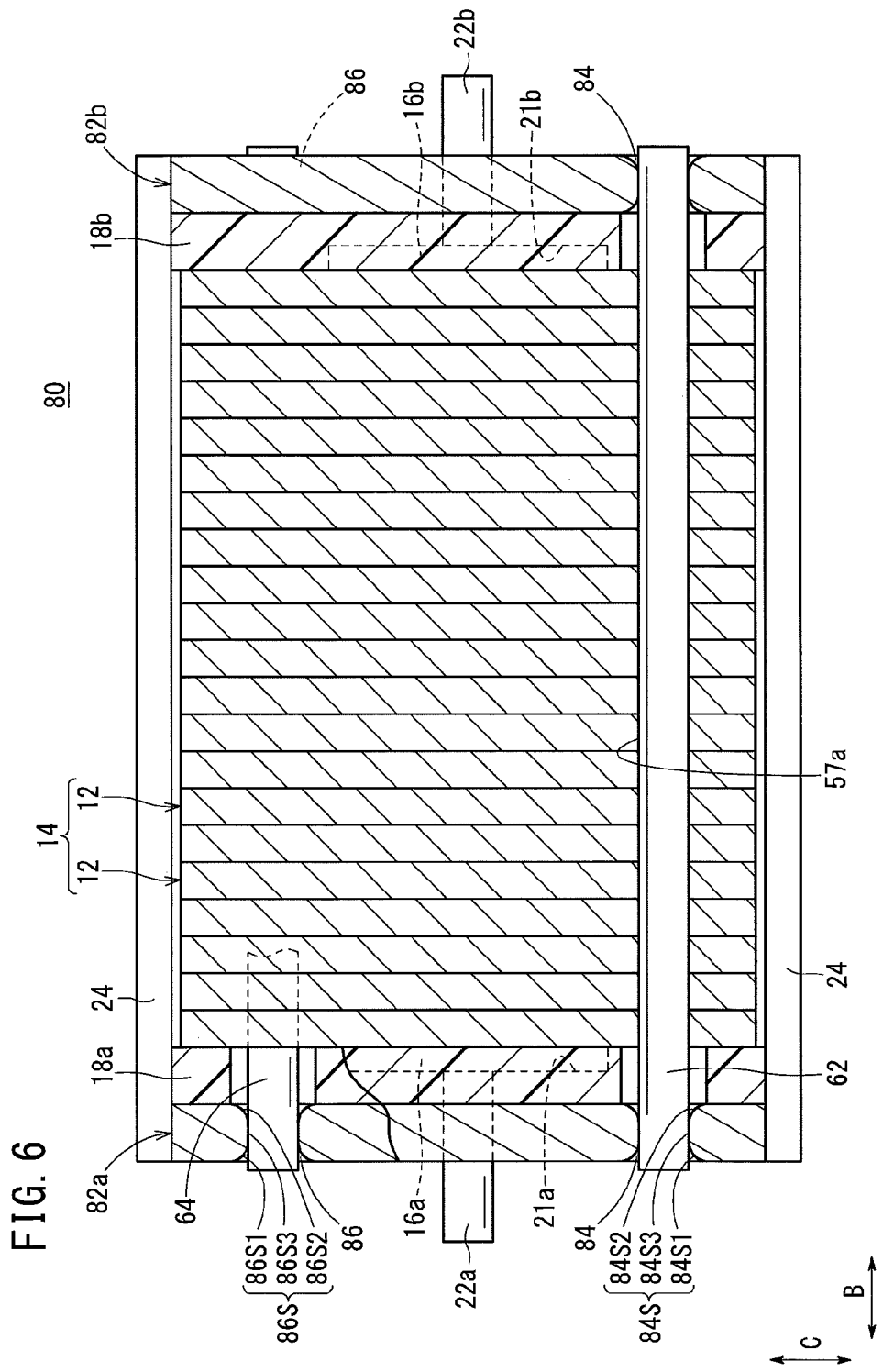
FIG. 6 is a cross sectional side view showing a fuel cell stack according to a second embodiment of the present invention.

FIG. 6 is a cross sectional view showing a fuel cell stack 80 according to a second embodiment of the present invention. The constituent elements that are identical to those of the fuel cell stack 10 according to the first embodiment are labeled with the same reference numeral, and description thereof will be omitted. In third to fifth embodiments described later, the constituent elements that are identical to those of the fuel cell stack 10 according to the first embodiment are labeled with the same reference numeral, and description thereof will be omitted.

The fuel cells stack 80 includes a first end plate 82a and a second end plate 82b provided at both ends in the stacking direction. Instead of the insertion holes 58, 60, insertion holes 84, 86 are provided in the first end plate 82a and the second end plate 82b.

Diameter-increasing surfaces are formed in an inner circumferential surface 84S of the insertion hole 84 in a direction spaced from a knock pin 62 to increase the diameter of the insertion hole 84. Specifically, at both ends of the inner circumferential surface 84S in the axial direction, surfaces 84S1, 84S2 curved in cross-section are formed as the diameter-increasing surfaces, and the curved surfaces 84S1, 84S2 are connected together by a surface 84S3 which is flat in cross-section and has a width smaller than a thickness of the first end plate 82a and the second end plate 82b.

Diameter-increasing surfaces are formed in an inner circumferential surface 86S of the insertion hole 86 in a direction spaced from a knock pin 64 to increase the diameter of the insertion hole 86. Specifically, at both ends of the inner circumferential surface 86S in the axial direction, surfaces 86S1, 86S2 curved in cross-section are formed as the diameter-increasing surfaces, and the curved surfaces 86S1, 86S2 are connected together by a surface 86S3 which is flat in cross-section and has a width smaller than the thickness of the first end plate 82a and the second end plate 82b.

In the second embodiment, the knock pins 62, 64 are fitted to the flat surfaces 84S3, 86S3 of the inner circumferential surfaces 84S, 86S of the insertion holes 84, 86, respectively. Thus, when an external load F is applied to the fuel cells stack 80, the knock pins 62, 64 can be tilt within the insertion holes 84, 86. It becomes possible to suppress the excessive bending load (stress) from being applied locally to certain portions of the knock pins 62, 64 in a concentrated manner. Accordingly, in the second embodiment, the same advantages as in the case of the first embodiment are obtained.

Figure 7:
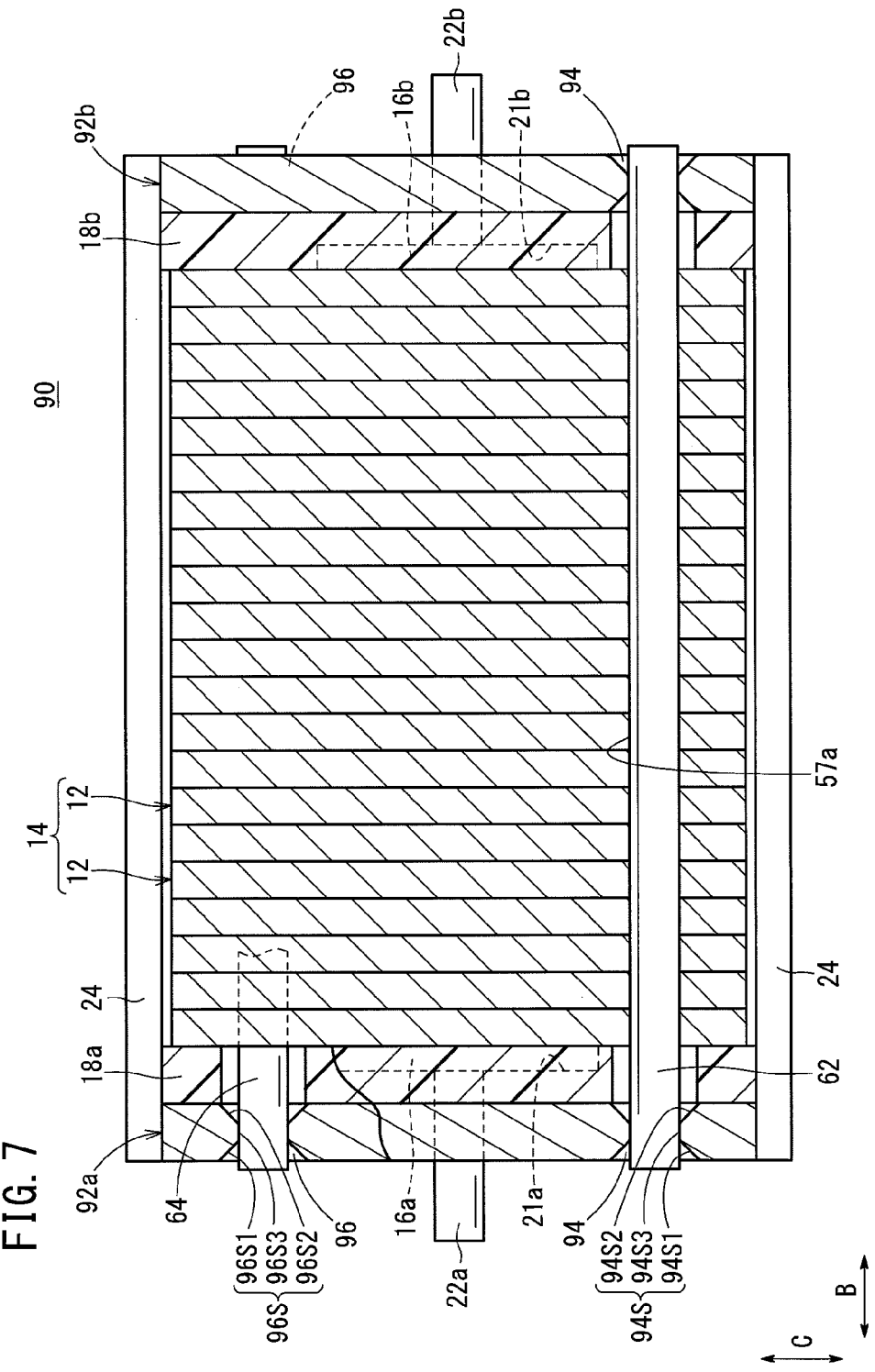
FIG. 7 is a cross sectional side view showing a fuel cell stack according to a third embodiment of the present invention.

FIG. 7 is a cross sectional side view showing a fuel cell stack 90 according to a third embodiment of the present invention.

The fuel cell stack 90 includes a first end plate 92a and a second end plate 92b provided at both ends in the stacking direction. Instead of the insertion holes 58, 60, insertion holes 94, 96 are formed in the first end plate 92a and the second end plate 92b.

Diameter-increasing surfaces are formed in an inner circumferential surface 94S of the insertion hole 94 in a direction spaced from the knock pin 62 to increase the diameter of the insertion hole 94. Specifically, at both ends of the inner circumferential surface 94S in the axial direction, surfaces 94S1, 94S2 inclined in cross-section are formed as the diameter-increasing surfaces, and the inclined surfaces 94S1, 94S2 are connected together by a surface 94S3 which is flat in cross-section and has a width smaller than a thickness of the first end plate 92a and the second end plate 92b. Preferably, the inclined surfaces 94S1, 94S2 extend straight.

Diameter-increasing surfaces are formed in an inner circumferential surface 96S of the insertion hole 96 in a direction spaced from the knock pin 64 to increase the diameter of the insertion hole 96. Specifically, at both ends of the inner circumferential surface 96S in the axial direction, surfaces 96S1, 96S2 inclined in cross-section are formed as the diameter-increasing surfaces, and the inclined surfaces 96S1, 96S2 are connected together by a surface 96S3 which is flat in cross-section and has a width smaller than the thickness of the first end plate 92a and the second end plate 92b.

In the third embodiment, the knock pins 62, 64 are fitted to, and held on the flat surfaces 94S3, 96S3 of the inner circumferential surfaces 94S, 96S of the insertion holes 94, 96. Thus, when an external load F is applied to the fuel cell stack 90, the knock pins 62, 64 can be tilt within the insertion holes 94, 96. Accordingly, the same advantages as in the case of the first and second embodiments are obtained.

Figure 8:
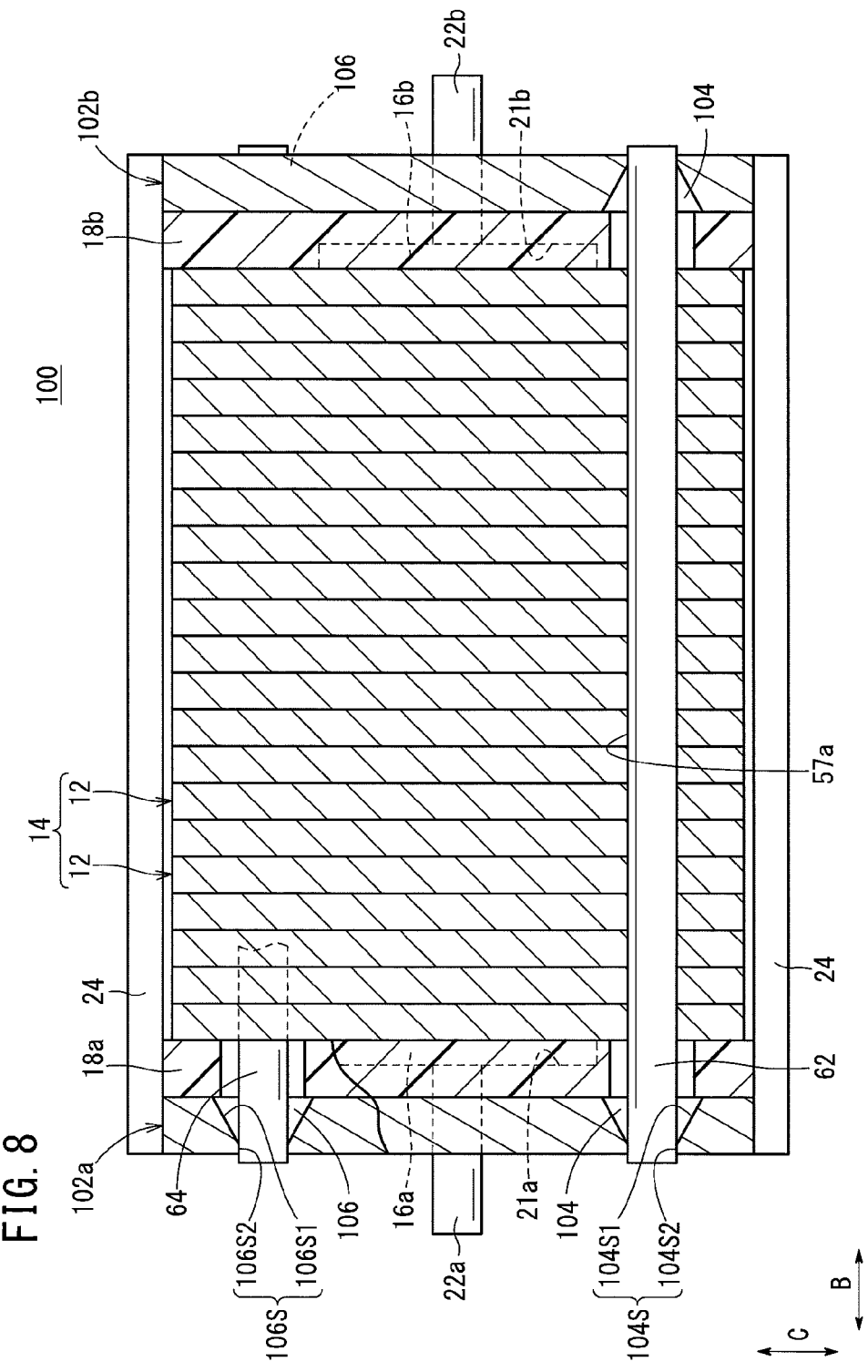
FIG. 8 is a cross sectional side view showing a fuel cell stack according to a fourth embodiment of the present invention.

FIG. 8 is a cross sectional side view showing a fuel cell stack 100 according to a fourth embodiment of the present invention.

The fuel cell stack 100 includes a first end plate 102a and a second end plate 102b provided at both ends in the stacking direction. Insertion holes 104, 106 are formed in the first end plate 102a and the second end plate 102b.

Diameter-increasing surfaces are formed in an inner circumferential surface 104S of the insertion hole 104 in a direction spaced from the knock pin 62 to increase the diameter of the insertion hole 104. Specifically, at one end of the inner circumferential surface 104S of the insertion hole 104 in the axial direction (inner side), a surface 104S1 inclined in cross-section is formed as the diameter-increasing surface. At the other end of the inner circumferential surface 104S of the insertion hole 104 in the axial direction (outer side), a surface 104S2 which is flat in cross-section and has a width smaller than a thickness of the first end plate 102a and the second end plate 102b is formed. Instead of the flat surface 104S2, a surface curved in cross-section (round surface) may be adopted.

Diameter-increasing surfaces are formed in an inner circumferential surface 106S of the insertion hole 106 in a direction spaced from the knock pin 64 to increase the diameter of the insertion hole 106. Specifically, at one end of the inner circumferential surface 106S of the insertion hole 106 in the axial direction (inner side), a surface 106S1 inclined in cross section is formed as the diameter-increasing surface. At the other end of the inner circumferential surface 106S of the insertion hole 106 in the axial direction (outer side), a surface 106S2 which is flat in cross section and has a width smaller than the thickness of the first end plate 102a and the second end plate 102b is formed. Instead of the flat surface 106S2, a surface curved in cross-section (round surface) may be adopted.

In the fourth embodiment, the knock pins 62, 64 are fitted to, and held on the flat surface 104S2, 106S2 of the inner circumferential surface 104S, 106S of the insertion hole 104, 106. When an external load F is applied to the fuel cell tack 100, the knock pins 62, 64 can be tilt within the insertion holes 104, 106, and the same advantages as in the cases of the first to third embodiments are obtained.

Figure 9:
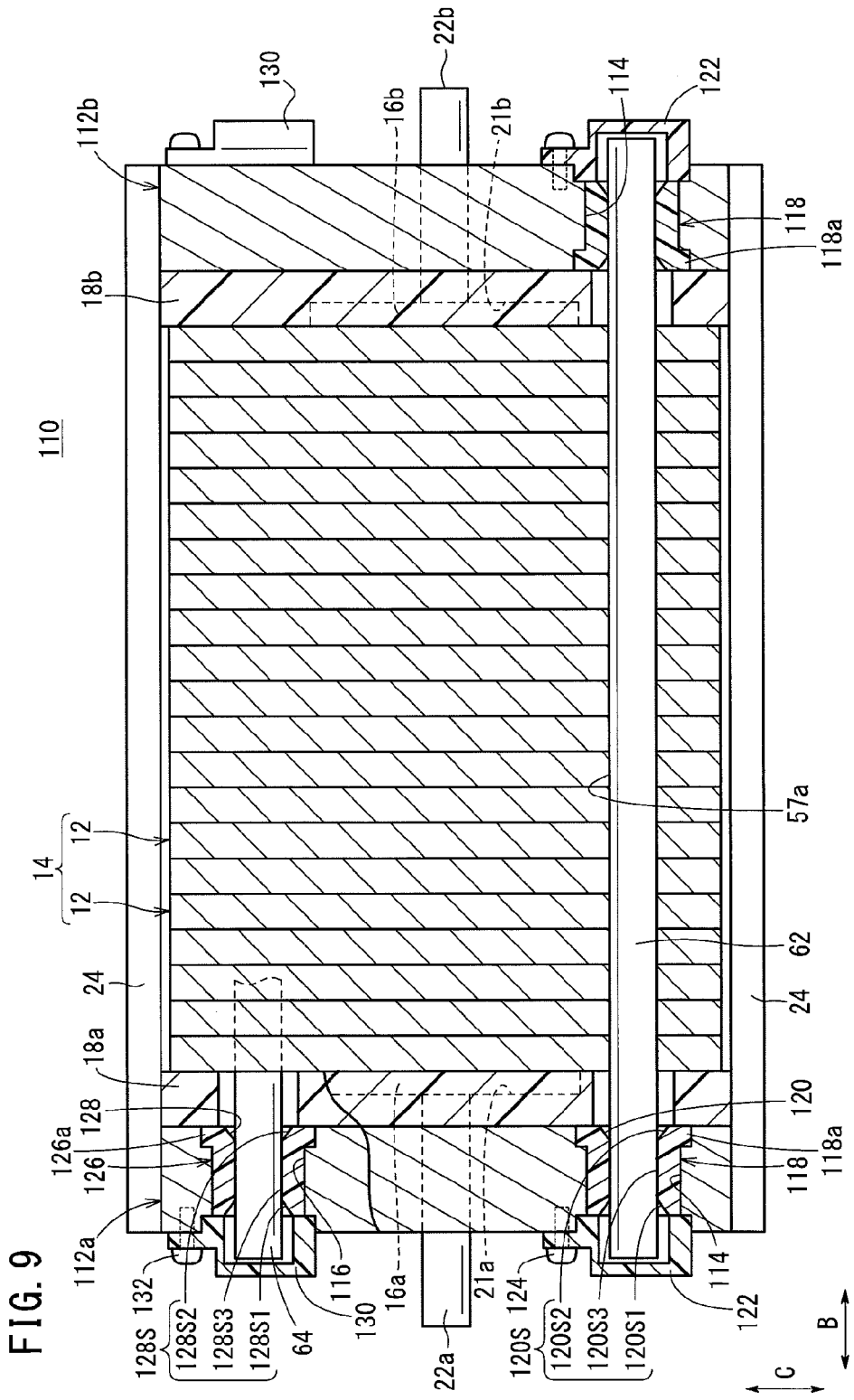
FIG. 9 is a cross sectional side view showing a fuel cell stack according to a fifth embodiment of the present invention.
Figure 10:
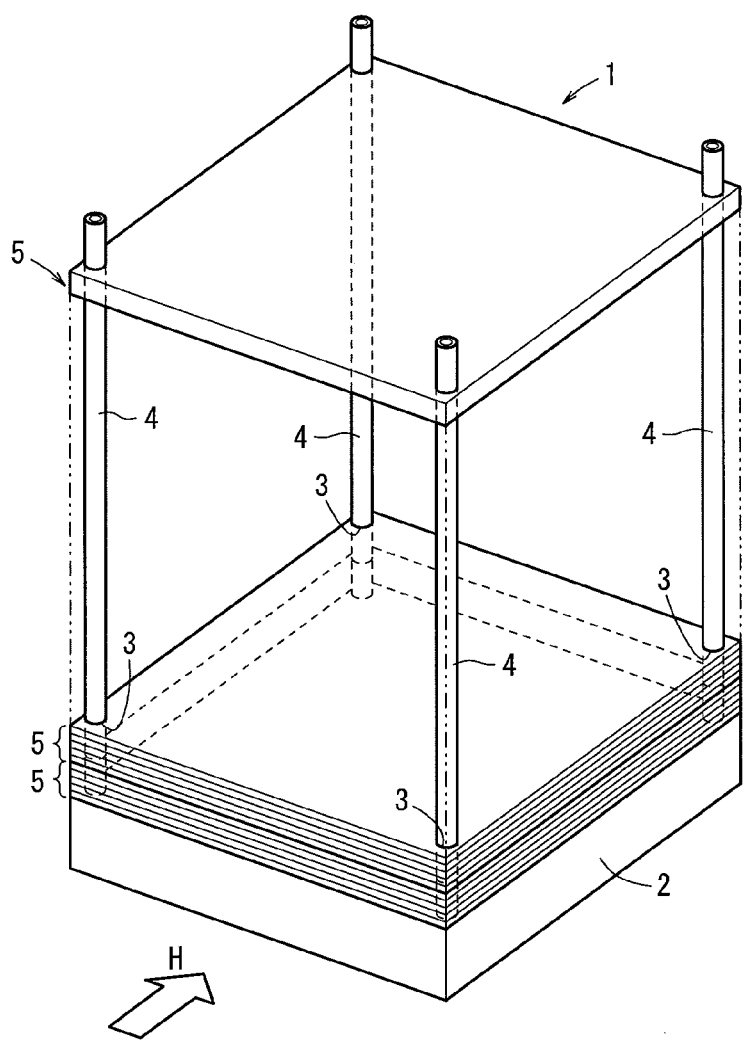
FIG. 10 is a view showing a method of assembling a fuel cell disclosed in Japanese Laid-Open Patent Publication No. 09-134734.

FIG. 9 is a cross sectional side view showing a fuel cell stack 110 according to a fifth embodiment of the present invention.

The fuel cell stack 110 includes a first end plate 112a and a second end plate 112b provided at both ends in the stacking direction. Stepped holes 114, 116 are formed in the first end plate 112a and the second end plate 112b. A knock pin 62 is inserted into each of the stepped holes 114. The stepped hole 114 includes large diameter portions at both ends, and an insulating resin collar member 118 is inserted into the stepped hole 114 from the inner side (from the side of insulating plate 18a or insulating plate 18b). In the structure, the knock pin 62 does not directly contact the first end plate 112a and the second end plate 112b, and occurrence of electric corrosion can be prevented.

A large diameter flange 118a is provided at one end of the resin collar member 118 having a cylindrical shape. The flange 118a is placed within the inner large diameter portion of the stepped hole 114. An insertion hole 120 is formed at the center of the resin collar member 118. Diameter-increasing surfaces are formed in an inner circumferential surface 120S of the insertion hole 120 in a direction spaced from the knock pin 62 to increase the diameter of the insertion hole 120. Specifically, at both ends of the inner circumferential surface 120s of the insertion hole 120 in the axial direction, surfaces 120S1, 120S2 inclined in cross-section are formed as the diameter-increasing surfaces. The inclined surfaces 120S1, 120S2 are connected together by a surface 120S3 flat in cross-section. It should be noted that the resin collar member 118 may adopt structure where the flange 118a is not provided.

A lid member 122 is provided at the outer large diameter portion of each of the stepped holes 114. The lid member is formed of material which is the same as or different from the resin collar member 118. In the state where the lid members 122 cover tip ends of the knock pin 62, the lid members 122 are fixed to the first end plate 112a and the second end plate 112b using screws 124.

The knock pin 64 is inserted into each of the stepped holes 116. The stepped hole 116 includes large diameter portions at both ends, and the insulating resin collar member 126 is inserted into the stepped hole 116 from the inner side (from the side of insulating plates 18a, 18b). In the structure, the knock pin 64 does not directly contact the first end plate 112a and the second end plate 112b, and occurrence of electric corrosion can be prevented.

A large diameter flange 126a is provided at one end of the resin collar member 126 having a cylindrical shape. The flange 126a is placed within the inner large diameter portion of the stepped hole 116. An insertion hole 128 is formed at the center of the resin collar member 126. Diameter-increasing surfaces are formed in an inner circumferential surface 128S of the insertion hole 128 in a direction spaced from the knock pin 64 to increase the diameter of the insertion hole 128. Specifically, at both ends of the inner circumferential surface 128s of the insertion hole 128 in the axial direction, surfaces 128S1, 128S2 inclined in cross-section are formed as the diameter-increasing surfaces. The inclined surfaces 128S1, 128S2 are connected together by a surface 128S3 flat in cross-section. It should be noted that the resin collar member 126 may adopt structure where the flange 126a is not provided.

A lid member 130 is provided at the outer large diameter portion of each of the stepped holes 116. The lid member 130 is formed of material which is the same as or different from the resin collar member 126. In the state where the lid members 130 cover tip ends of the knock pin 64, the lid members 130 are fixed to the first end plate 112a and the second end plate 112b using screws 132.

In the fifth embodiment, the knock pins 62, 64 are fitted to, and held on the flat surfaces 120S3, 128S3 of the inner circumferential surface of the resin collar members 118, 126. In the structure, when an external load F is applied to the fuel cell stack 110, the knock pins 62, 64 can be tilt within the insertion holes 120, 128. Accordingly, the same advantages as in the cases of the first to fourth embodiments are obtained.

The insertion holes 120, 128 have the same structure as the structure of the third embodiment. However, the present invention is not limited in this respect. The insertion holes 120, 128 may have the structure of the first embodiment, the second embodiment, or the fourth embodiment. Further, spring members having elasticity may be provided between one of the end plates and the insulating plate.

While the invention has been particularly shown and described with reference to preferred embodiments, it will be understood that variations and modifications can be effected thereto by those skilled in the art without departing from the scope of the invention as defined by the appended claims.

What is claimed is:

1. A fuel cell stack includes a stack body formed by stacking a plurality of power generation cells in a stacking direction, the power generation cells each being formed by stacking a membrane electrode assembly and a separator, the membrane electrode assembly including a pair of electrodes and an electrolyte membrane interposed between the electrodes, end plates being provided at both ends of the stack body in the stacking direction,
   wherein a knock pin extending in the stacking direction is provided between the end plates for positioning the stack body; and
   each of the end plates has an insertion hole for insertion of the knock pin, a diameter-increasing surface is formed in an inner circumferential surface of the insertion hole in a radial direction spaced from the knock pin to increase the diameter of the insertion hole,
   wherein the knock pin tilts in an axial direction in correspondence with the diameter increasing surface.

2. The fuel cell stack according to claim 1, wherein, at both ends of the inner circumferential surface in an axial direction, surfaces curved or inclined in cross-section are formed as the diameter-increasing surface, and the curved or inclined surfaces are connected together by a surface flat in cross-section.

3. The fuel cell stack according to claim 1, wherein, at one end of the inner circumferential surface in an axial direction, a surface curved or inclined in cross-section is formed as the diameter-increasing surface, and at another end of the inner circumferential surface in the axial direction, a surface flat or round in cross-section and connected to the curved or inclined surface is provided.

4. The fuel cell stack according to claim 1, further including a resin collar member inserted into a hole of at least one of the end plates, wherein the insertion hole is formed in the resin collar member.

* * * * *